United States Patent Office 3,804,775
Patented Apr. 16, 1974

3,804,775
METHOD OF PREPARING MICROCAPSULES
Tomoharu Shiozaki and Jujiro Kono, Osaka, Japan, assignors to Kanzaki Paper Mfg. Co., Ltd., Tokyo, Japan
No Drawing. Filed Dec. 13, 1971, Ser. No. 207,568
Claims priority, application Japan, Dec. 25, 1970, 45/127,017
Int. Cl. B44d 1/02; B01j 13/02
U.S. Cl. 252—316                    16 Claims

ABSTRACT OF THE DISCLOSURE

A microencapsulation process is disclosed using a mixture of solutions of polymer materials useful over a wide pH range which includes bringing core particles, either of a water-immisible liquid or particulate solid, into contact with an aqueous solution of gelatin and polyvinyl alcohol, or their water soluble derivatives, causing the gelatin component to undergo phase separation forming an encapsulating shell composed primarily of the gelatin component is formed around the individual core particles, then lowering the temperature of the mixture to cause the gelatin component that surrounds the individual core particles to gel. Substantially uniform nonagglomerated microcapsules so formed are useful as surface coatings on a substrate material, such as a pressure sensitive recording paper.

---

This invention relates to a novel process of microencapsulation.

More specifically, this invention pertains to the microencapsulation of minute substantially discrete particles of either water-insoluble particulate solids or water-immiscible liquid materials dispersed as fine droplets, by causing deposition of a surrounding layer of gelatin about said particles by a process of causing phase separation to occur in an aqueous mixture of first a substantially solution of gelatin and secondly a substantially aqueous solution of a polyvinyl alcohol, and the capsular suspension thereby produced.

Microcapsules containing liquid or solid nucleus material have found widespread acceptance in a variety of commercial applications. For example, one of the most widespread utilities has been in the art of pressure-sensitive recording systems, and several types of record sheet materials have been known. U.S. Pat. No. 2,730,456 discloses a transfer-copy system wherein minute oil droplets of a colorless dye intermediate, dispersed or dissolved in an oil, are encapsulated and coated onto a transfer sheet. The dye intermediate is thereafter transferred to a copy sheet by rupturing said capsules. The underlying copy sheet has a color reactant coating thereon containing a material which will react with the dye intermediate causing a visible colored mark at points where the microcapsules have been ruptured and the dye has been transferred.

U.S. Pat. No. 2,730,457 discloses another type of a pressure-sensitive record sheet there is disposed on one surface of the same sheet both the color reactant and the capsules containing oil droplets in which the dye intermediate is dissolved. This record material is referred to as a "self contained" system.

More recently, Japanese Pat. No. 511,757 (corresponding to U.S. patent application Ser. No. 392,404, filed Aug. 27, 1964, and now abandoned, and German Pat. No. 1,275,550) discloses a novel pressure-sensitive recording system. This system comprises disposing on and/ or within a sheet support material the unreacted markforming components (at least one of which is a polymeric material such as phenol-aldehyde, phenol-acetylene polymers, etc.) and a liquid solvent, in which each of the mark-forming components is soluble, said liquid solvent being present in such a form that it is maintained isolated from at least one of the mark-forming components by a pressure-rupturable capsule thereabout. Further, a utility for microencapsulated particles in thermosensitive recording systems is disclosed, for example, in Australian Pat. No. 238,230. Other applications in which microcapsules have been used extensively are in adhesive and adhesive tapes, fertilizers, pharmaceuticals, foods and cosmetics, etc.

Up to this time, several attempts have been made to capsulate such core material as water-insoluble or water-immiscible solid or liquid particles. In most of these attempts to date, the "coacervation" system has been known.

Coacervation can be of two general types.

The first is called "salt" coacervation wherein liquid phase separation occurs by the addition of such a salt solution as sodium sulphate or ammonium sulphate to form a colloidal solution (this system is disclosed in U.S. Pat. No. 2,800,458). However, this process is almost impracticable, except for special cases, since the presence of a large amount of salt in this system requires their removal out of capsule wall after microencapsulation. Further control of capsule size is very difficult, due to the agglomerating tendency of the microcapsule.

The second "coacervation" process is termed "complex" coacervation, as described in U.S. Pat. No. 2,800,-457, wherein phase separation occurs by the addition of a second colloidal solution to a first colloidal solution, the particles of the two dispersed colloids being oppositely charged. For instance, a gelatin solution having an isoelectric point at pH 4.8 is negatively charged at pH of more than 4.8 and is positively charged when pH is below 4.8. Whereas a gum arabic solution is negatively charged regardless of pH. Therefore, the mixture of these two solution never reacts at pH of more than 4.8, but only forms a complex coacervate of gelatin and gum arabic through their interaction at pH levels below about 4.8. Further, the colloidal materials useful in this system must have an ionizable property. The examples of such materials are casein, albumin, hemoglobin, Irish moss, sodium alginate, in addition to the above-mentioned gelatin and gum arabic.

However, this complex coacervation will occur only within a limited pH range, and within limited ranges of colloid concentration. For this reason, this system requires dilution and/or adjustment of the pH of the mixture. In this complex coacervation system, a mixture of gelatin and gum arabic in substantially equal quantity is the most commonly used, however, such a mixture of gelatin and gum arabic must also comply with the following conditions in order that a practically useable coacervate be obtained out of the mixture. Namely, the concentration of each of the gelatin and gum arabic in the mixture should be less than about 3%, and, at the same time, the pH of the mixture should be adjusted to the point below iso-electric point of gelatin, generally to a level less than about pH 4.5. This has been described in the book written by Asaji Kondo, "Microcapsules," see page 74, published by Nikkan Kogyo Shinbun, Apr. 20, 1970.

Accordingly, this "complex coacervation" system requires careful observation and strict control of the pH and concentration of the mixture throughout the microencapsulation steps. Also, since the coacervation can only occur when the mixture is adjusted to the acidic side, the water-insoluble or water-immiscible core material to be dispersed in the solution must be stable to such acid conditions. Thus, application of this microencapsulation process is restricted to certain such components. Further, the final capsular suspension is not entirely satisfactory for use as a coating color for surface coating in that neither the desired viscosity nor fluidity of coating color can be obtained because of low concentration levels required during the process, and, at the same time, excessive water contents decrease the drying efficiencies during the drying step. For such reason, thus-produced coating colors have sometimes been condensed, say, by a centrifugal separator in the manufacturing of pressure-sensitive recording sheets.

The object of the present invention is to provide a novel and useful microencapsulation process which overcomes the disadvantages of the above-discussed prior coacervation encapsulation systems.

Accordingly, one object of the invention is to provide a method of preparing microcapsules wherein the mixture of solutions of polymer materials employed are not restricted to those useful within a specific narrow pH range.

A second object of the invention is to provide a method of preparing microcapsules under which concentration of the mixture of solutions of polymer material need not be limited to an undesirable range of highly "diluted" conditions.

A third object of the invention is to provide an improved method for preparing microcapsules free from unduly complicated adjustments and close process controls.

A fourth object of the invention is to provide a method of preparing microcapsules which can employ a wide range of materials as the core materials in the capsule, without being limited only to such material as are stable to acid conditions.

A fifth object of the invention is to provide a microcapsular suspension of substantially uniform non-agglomerated microcapsules, which is very useful to provide a coating color for surface coating.

A general object of this invention will be understood to be to provide a novel and improved process for forming a suspension of microencapsulated materials, wherein the core material in the microcapsule has one or more desired functional properties of utility in a surface coating subsequently formed from said suspension on a substrate sheet material.

The functional properties useful for the core material include dye or pigment characteristics, or an ability to form a dye or pigment color by reaction on contact with another substance, or an exposure to heat; or, for instance, magnetic or electrical properties.

Further objects of this invention will become apparent in the following specification.

The preferred essential method of this invention consists of microencapsulation carried out in the folowing manner: An aqueous solution of gelatin and/or a derivative thereof is also prepared. A core material, either liquid or solid, is then dispersed in either or both above two separate solutions. Then, these two solutions, at least one of which contains a dispersion of the core particles, are mixed. During this mixing stage, phase separation is induced and an encapsulating shell of a colloid rich portion of gelatin or its derivatives is deposited around core particles. This phase separation is induced by adjusting and maintaining the concentration of the polyvinyl alcohol, or its derivatives, in the mixture to a level of at least more than 0.5% by weight, while at the same time the pH of the mixture is maintained within a range that does not prevent, e.g. substantially impede, such phase separation. All the foregoing steps are also carried out at a temperature above the gel point of the gelatin employed. Gelling of the encapsulating shell material is then subsequently effected by lowering the temperature to a level at or below the gelling point of the gelatin surrounding the core particles.

It will be appreciated that an essential point of this invention is that the phase separation of the gelatin is induced by the presence of the minimum stated concentration of the polyvinyl alcohol which is also present in the solution. The pH of the solution is important, but principally only to the extent that it should be within such a range wherein the phase separation can occur. The temperature is also important, but principally only to the extent that it should be above the gelling point of the gelatin during that stage of the process where the encapsulation of the core particles is induced and before the encapsulating shell is desired to be gelled.

Above mentioned microencapsulation of this invention, which is entirely different from conventional coacervation system, offers a number of advantages. For the purpose of the following description, polyvinyl alcohol and its derivatives are simply described as "PVA," and gelatin and its derivatives are described as "gelatin."

As already stated, the most important single aspect of this microencapsulation process with respect to the phase separation of the gelatin is the concentration of PVA in the mixture. This concentration is adjusted simply by determining the amount of PVA required in the separate PVA solution in order to give the required concentration level in the final mixture. It is important in the practice of this invention, that the concentration of the PVA in the mixture has to be adjusted at more than about 0.5% by weight, which is the minimum concentration of PVA required in order to have phase separation. That is, phase separation does not occur when the PVA concentration is below about 0.5%. The higher the PVA concentration, the faster the phase separation occurs, and, at the same time, a larger yield of the colloid rich gelatin shell portion is obtained.

This fact is one of the remarkable differences between the present invention and the known complex coacervation, in which the concentration of colloid is restricted to be within a diluted range only. Generally, the maximum concentration of PVA in the mixture can be selected as desired, with due consideration given to its solubility, effect on viscosity, and so on, but, as a practical matter, the maximum convenient concentration of PVA in the mixture is adjusted at about 12% by weight. The concentration of gelatin is usually maintained between about 1.5 and 15% the level being selected pursuant to the desired quantity of microcapsules to be prepared. In this case, quantity of gelatin is not necessarily to be equal to that of PVA, but may be in the range of 0.05 to 30 parts of gelatin per part of PVA, more desirably, 5 parts of gelatin to 3 parts of PVA by solid weight. Excessive imbalance of this ratio is, of course, not desirable, but the optimum ratio can possibly be determined according to the experience.

Another remarkable difference of this invention as compared to the complex coacervation system is that no adjustment of pH of the mixture is required, in order to maintain it below the iso-electric point of gelatin. In fact, the phenomenon of phase separation in the practice of this invention does not in any way depend on a change of charge of gelatin solution, but rather on mixing of specific amount of PVA as above mentioned. Indeed, when the concentration of PVA in the mixture is kept comparatively high, phase separation will occur practically regardless of pH of the mixture. In other words, it is generally unnecessary to adjust the pH with regard to the iso-electric point of gelatin. While the closer the pH is to iso-electric point, the faster the phase separation step occurs, and the greater the degree of formation of the gelatin, colloid rich portion. Phase separation is nonetheless easily caused even at points exceeding the iso-electric point. It is only when the concentration of PVA in the mixture is adjusted at around the minimum of 0.5%, that it is required to maintain the pH as close as possible at the level of the iso-electric point of gelatin in order to obtain practical capsules.

Accordingly, the only adjustment of pH that is required in this invention is to maintain the pH of gelatin solution at or around iso-electric point in those embodiments when the PVA concentration in the mixture is adjusted to a relatively low level. As will be understood from the above, the expression "the pH of the mixture being maintained at the optimum range which does not prevent phase separation," as used in this specification and the appended claims, means that the pH is to be maintained within a range that permits phase separation in compliance with the employed concentration of PVA in the mixture, regardless of the adjustment of the pH of the mixture. Thus, a critical range of pH for the mixture should not be defined. Therefore, the pH of the mixture need not necessarily be specifically adjusted; however, it is preferable that the pH is maintained at or around the iso-electric point of gelatin say with ±2 pH units, preferably ±1.5 pH units. For example, in the case of an acid-treated gelatin having an iso-electric point at pH 8.0, the pH of the mixture is to be maintained within a range of between about 6.5 and 9.5. And, in case alkali-treated gelatin having iso-electric point at pH 4.8 is used, the pH of the mixture is maintained within a range between 3.5 and 6.5. Previously, it has been mentioned that the most effective phase separation is obtained when the pH of the mixture is maintained close to the iso-electric point of gelatin. Also, it has been mentioned that the adjustment of the concentration of PVA in the mixture at a relatively high level is desirable.

From these considerations, it has been confirmed that, under this invention, the most effective phase separation is obtained when the pH of the mixture is maintained close to isoelectric point of gelatin and when concentration of PVA in the mixture is adjusted to a level of at least more than about 2%. In each instance, concentration of the gelatin and PVA in the mixture means parts by solid weight. For example, if the mixture consists of water 80 parts by weight, PVA 10 parts by weight, gelatin 10 parts by weight and core particles 5 parts by weight, the concentration of PVA is 11.1% and that of gelatin is also 11.1%.

The gelatins which are useful in this invention include the acid-treated gelatins, the alkali-treated gelatins and their water-soluble derivatives. All these gelatins are commonly available in the market. Generally, the iso-electric point of an acid-treated gelatin is from about 7.0 to about 10.0, while that of alkali-treated gelatins is from about 4.0 to about 7.0. As examples of gelatin derivatives, there may be mentioned graft-gelatin copolymers with acrylic amide, vinyl pyrrolidone, acrylic acid, methacrylate esters etc. It is desirable that all of these gelatins have a relatively high molecular weight.

On the other hand, the PVA's useful for this invention are restricted only to such material of more than about 1000 degrees of polymerization, and of more than about an 85% degree of hydrolyzation. Under this invention, the degree of polymerization of PVA is one of the important requirements, and it is impossible to obtain the desired phase separation if the degree of polymerization is too low. For this purpose, under this invention, the degree of polymerization of PVA is restricted to be more than about 1000 as a suitable lower limit in order to effectively obtain phase separation and deposit on core materials. The maximum limit for the degree of polymerization of PVA is not herein specified since, generally, it is established merely according to the desired viscosity of aqueous solution.

Under this invention, the desired range degree of polymerization of PVA is between about 1000 and about 2400, more desirably, between about 1400 and about 1700. On the other hand, degree of hydrolyzation of PVA is not such an important factor of the phase separation under this invention; however, it is restricted to be more than about 85%, from the standpoint of its water solubility. Derivatives of polyvinyl alcohol include known modified polyvinyl alcohol wherein a small portion of the hydroxyl groups are replaced by such substituent groups as —COOH, —NH$_2$, —CONH$_2$ and —OCOCH$_3$; however, the degree of modification or substitution should be restricted within a range which does not significantly change the fundamental nature of PVA itself; namely a desired range limit for the substituent content not exceeding about 5 mol percent.

The core materials useable in the invention include water-insoluble or water-immiscible fluid suitable for making oil-in-water emulsions, such as olive oil, coconut oil, castor oil, fish oil, sperm oil, petroleum lubricating oil, kerosene, xylene, chlorinated diphenyl, methyl salicylate, etc. Also, this invention contemplates the use of liquids containing dissolved or dispersed material such as medicines, adhesives, dyes, and the like. For the solid materials, water-insoluble solid finely divided particles such as calcium carbonate, zinc sulphate, carbon black, polymeric solid particles and solid particulate catalysts may be useful.

In practicing this invention, after the gelation, any of the already known further steps of hardening a gelled gelatin may be used, as desired: e.g. separating the hardened gelled material from the remaining liquid; drying it; and comminuting it to the desired particle size. The capsular suspension, after completion of the formation of the capsules, may be used directly for forming a coating for a surface, or for other uses in this fluid form. Additional methods for hardening the capsule walls, generally, the addition of hardening agents such as formaldehyde, glutaraldehyde, tannic acid or the application of radiant energy are known, and may be used.

In general, the step of gelation for forming the capsule wall is carried out by gradually adding comparatively large quantities of water in order to cool down to a temperature below the gelation point of gelatin while preventing the mixture from becoming an excessive viscosity up or a lumpy mass. By this method the concentration of the capsular suspension inevitably becomes low at a final stage, however, the diluting water has been necessary because of the increase in viscosity experienced by mere cooling alone.

A further improvement of this invention is to avoid this undesirable dilution technique by adding peroxides such as sodium peracetate, periodic acid or periodates such as potassium periodate and sodium periodate, into the capsular suspension before the gelation of capsulated gelatin and PVA mixture in the capsular suspension is completed. This addition can be made while maintaining the temperature of the capsular suspension at a temperature above the gelation point of capsular suspension, and it is then observed that the viscosity of the capsular suspension is abruptly lowered. More desirable addition can be made while maintaining the temperature of the capsular suspension at a temperature approximately the gelation point of gelatin of capsule wall in order to prevent the damage of capsule wall. This effect is considered to be caused by a decrease of the molecular weight of the PVA in the capsular suspension due to depolymerization from reaction with the peroxides, etc. Thus, as a result of this lowering of the viscosity of the capsular suspension, it is reduced or not necessary to add diluting water for the temperature reduction at the gelation step, and the desired gelation is completed only by a simple step of cooling down the capsular suspension to an extent below temperature of the gelation point of gelatin, while avoiding an unworkable increase in the viscosity of the suspension.

Accordingly, by this aspect of this invention, much higher concentrations of the final capsular suspension can be obtained, inasmuch as the amount of dilution water required to be added at the gelation step is decreased. The resulting more concentrated capsular suspension is more desirable for production of various coatings.

As described above in detail, the phase separation phenomena under this invention occurs under different conditions from those of the known coacervations system, which are based on the electrical charge interaction between colloidal materials. The inventors are still not in a position to confirm what function causes such phase separation of this invention; however, it is considered that this is due to the interaction of the non-electrolyte solutions based on van der Waals forces, following the theory of Flory-Huggins, et al. ("Principles of Polymer Chemistry," by Paul J. Flory, copyright 1953 by Cornell University)—and according to the fact that polyvinyl alcohol is a hydrophilic polymer of so-called non-ionizable material having no effective electric charge, and that the interaction parameter having much to do with incompatibility of gelatin and polyvinyl alcohol is large enough, so that effective phase separation can be obtained under higher PVA concentration even though a PVA of a lower polymerization degree is used, and also that effective phase separation can be obtained with PVA of higher degrees of polymerization even though lower concentration is used.

As understood from the above description, this invention offers a number of advantages over coacervation systems. The first advantage of the invention is that no strict observation of adjustment of pH and concentration of the mixture of solutions is required, which makes it easy to control the operation during capsule formation. Secondly, any core materials for enclosure within capsules can be used, and the process is not restricted to only those materials which are stable to acids, enabling one to utilize extensive kinds of materials, so long as they are water-insoluble or water-immiscible liquid or solid. Thirdly, comparatively high concentration capsular suspensions can be obtained offering more useful coating colors for surface coating. Fourthly, capsules with more dense capsule walls can be obtained, assuring more stability and longer protection of the core materials. Further advantages will be understood from the aforementioned descriptions.

Microencapsulation of this invention can be applied in the field of adhesive tapes, fertilizers, pharmaceuticals, foods and cosmetics, etc., however, we find most widespread utilities in the field of manufacturing pressure-sensitive recording sheet material. The advantages brought about by the use of this invention in the manufacture of pressure-sensitive recording sheet are as follows: preparation of coating color of capsular suspension can be easily operated, and the resultant final capsular suspension of comparatively high concentration makes conventional condensation step unnecesary, and accelerate the running speed due to the increase of drying efficiency. Also, the dense capsule wall of the resultant capsules protects the sheet against smudges during storage or handling steps because of its stability. And, further, PVA helps maintain stable quality of the recording sheet because of its more stabilized quality as a raw material, than such natural polymer material as gum arabic.

The following examples serve to illustrate further the invention although the invention is not limited to these examples.

EXAMPLE 1

An acid-treated gelatin (25 grams) derived chiefly from pigskin and having a gelling point of 25.1° C. in 10% aqueous solution, and a viscosity of 115 millipoise in 12.5% aqueous solution and 162–170 grams of jelly strength as 6.66% aqueous solution (obtained by Japan Industrial Standard K6530/1970), made by Nihon Hikaku K.K. and having an iso-electric point of pH 8.0 was dissolved in 325 grams of water at 60 degrees centigrade to make a gelatin solution. And, 3 grams of crystal violet lactone and 2 grams of benzoyl leucomethylene blue were dissolved in 100 grams KMC–A (iso-propylated naphthalene, made by Kureha Kagaku K.K., Japan). This oil solution was added into the above gelatin solution with continuous stirring to cause emulsification making an average particle size of oil droplets of about 4–5 microns. Then a solution of 2.5% sodium hydroxide was added into the emulsion so that the pH was controlled at about 7.0. At this stage, the pH of the emulsion could have been more than 8.0, which is the iso-electric point of the gelatin, however, the pH was controlled at a lower, practically optimum, pH of 7.0 simply in order to avoid "shock" resulting from faster addition of Formalin at the subsequent hardening stage. If the pH of the emulsion had been controlled at a level above 8.0, the pH would subsequently have had to be re-adjusted to the acid side, prior to the said hardening stage. Then, separately, 15 grams of PVA–117 (polyvinyl alcohol, average polymerization degree at 1700, hydrolyzation degree at 98%, made by Kurare K.K., Japan) was added into 135 grams of water to make a PVA solution. This PVA solution was then mixed with said emulsion with continuous stirring. At that time, phase separation occurred and, at the same time, gelatin was deposited around oil droplets. The concentration of gelatin in the above mixture at this final stage was 5.15% and the PVA concentration was 3.15% and pH of the mixture had been maintained at 7.0. This mixture was then cooled down to approximately 28° C. with stirring, and, further, to the mixture there was slowly added about 450 grams of water to bring the temperature down to 10° C. Then, 30 grams of 10% formaldehyde was added for hardening the gelatin shell. The pH of the mixture was controlled at the range between 10.0 and 10.5 by addition of 2.5% sodium hydroxide solution. At this stage, capsule formation was completed, and the resultant capsular suspension was used as a coating color for the manufacture of pressure-sensitive recording paper. This capsular suspension was coated on one side of a base paper of 45 grams per square meter by the weight of 5 grams per square meter on dry basis. The resulting pressure-sensitive recording paper was useful, and at least equal to known recording papers.

EXAMPLE 2

This example is similar to Example 1 except that PVA–124 (polyvinyl alcohol, average polymerization degree at 2400, hydrolyzation degree at 98%, made by Kurare K.K., Japan) was used as the PVA. Similar results as in Example 1 were obtained.

EXAMPLE 3

This example is similar to Example 1 except that PVA–115 (polyvinyl alcohol, average polymerization degree at 1500, hydrolyzation degree at 98%, made by Kurare K.K., Japan) was used as the PVA. Results similar to Example 1 were obtained.

EXAMPLE 4

This example is similar to Example 1 except that modified PVA (carboxyethylated polyvinyl alcohol, average polymerization degree at 1700, hydrolyzation degree at 98%, substitution degree of 4 mol percent) was used as the PVA, and similar results as in Example 1 were observed.

EXAMPLE 5

This example is similar to Example 1 except that a modified gelatin (an acid-treated gelatin-acrylic amide graft-copolymer) was used and the pH of the emulsion was not controlled, and the results were similar to Example 1.

EXAMPLE 6

Acid-treated gelatin (25 grams, made by Nihon Hikaku K.K., see Example 1) having an iso-electric point of pH 8.0 was dissolved in 325 grams of water at 60° C. to make a gelatin solution. Then, 3 grams of crystal violet lactone and 2 grams of benzoyl leucomethylene blue, dissolved in a mixture consisting of 30 grams of kerosene and 70 grams of HB–40 (hydrogenated triphenyl, made by Monsanto Company, U.S.A.), was added into the above gelatin solution with continuous stirring to cause emulsification forming oil droplets of an average particle size of about 4–5 microns. A solution of 2.5% sodium hydroxide was added into the emulsion so that pH was controlled at around 9.0. Separately, 15 grams of PVA–

217 (polyvinyl alcohol, average polymerization degree at 1700, hydrolyzation degree at 87%, made by Kurare K.K. Japan) was dissolved in 135 grams of water to make a PVA solution. This PVA solution was then mixed with said emulsion with continuous stirring. At that time, i.e. during the mixing stage, phase separation occurred and, at the same time, gelatin was deposited around oil droplets. The concentration of gelatin in the said mixture at this final stage was 5.15% and concentration of PVA was 3.15% and pH of the mixture had been maintained at 9.0. Subsequent steps were similar to those of Example 1 except that the pH of the mixture was controlled at 7.0 by addition of 10% acetic acid solution prior to adding formaldehyde. Similar results as in Example 1 were obtained.

EXAMPLE 7

Acid-treated gelatin (50 grams, see Example 1, made by Nihon Hikaku K.K.) having an iso-electric point of pH 8.0 was dissolved in 230 grams of water at 60° C. to make a gelatin solution. Then, 3 grams of crystal violet lactone and 2 grams of benzoyl leucomethylene blue were dissolved in a mixture consisting of 30 grams of kerosene and 70 grams of mono-iso-propyl biphenyl, and this oil solution was added into the above gelatin solution with continuous stirring to cause emulsification, making oil droplets of an average particle size of about 4-5 microns. The pH of the resulting emulsion was 4.6. Separately, 42 grams of PVA-117 (see Example 1) was dissolved into 240 grams of water to make a PVA solution. This PVA solution was then mixed with said emulsion, with continuous stirring. Phase separation occurred with deposition of gelatin around the oil droplets. The concentration of gelatin in the above mixture at this final stage was 9.6% and PVA concentration was 8.2% and pH of the mixture had been maintained at approximately 4.6.

This mixture was then cooled down to 30° C. with stirring, and 250 grams of an aqueous solution containing 0.5 grams of sodium periodate was added therein to. This addition caused a sharp drop in the viscosity of the mixture, and then the resultant mixture was then cooled down to 18° C. Then, 30 grams of 10% formaldehyde was added for hardening. The pH of the said mixture was controlled at the range between 10.0 and 10.5 by addition of 2.5% sodium hydroxide solution. At this stage, capsule formation was completed, and resultant concentrated capsular suspension was used as a coating color for the manufacture of useful pressure-sensitive recording paper.

EXAMPLE 8

This example is similar to Example 7 except that PVA-210 (polyvinyl alcohol, average polymerization degree at 1000, hydrolyzation degree at 87%, made by Kurare K.K.) was used as PVA and the pH of the emulsion was controlled at approximately 7.0 by addition of 2.5% sodium hydroxide solution. Similar results as in Example 7 were obtained.

EXAMPLE 9

Alkali-treated gelatin (25 grams; having a gelling point of 26.4° C. in 10% aqueous solution, a viscosity of 46 millipoises in 12.5% aqueous solution, and 228 grams of jelly strength as 6.66% aqueous solution; made by Nihon Hikaku K.K.) having an iso-electric point of pH 4.8 was dissolved in 230 grams of water at 60° C. to make a gelatin solution. After 3 grams of crystal violet lactone and 2 grams of benzoyl leucomethylene blue were dissolved in a mixture consisting 30 grams of kerosene and 90 grams diphenyl trichloride, the resulting oil solution was added into the above gelatin solution with continuous stirring to cause emulsification, forming an average particle size of oil droplets of about 4-5 microns. Then a solution of 10% acetic acid was added into the said emulsion so that pH was controlled at around 4.8. Separately, 15 grams of PVA-117 (see Example 1) was dissolved into 135 grams of water to make a PVA solution, and this PVA solution was then mixed with said emulsion with continuous stirring. At that time, phase separation occurred and, at the same time, gelatin was deposited around oil droplets. The concentration of gelatin in the mixture at this final stage was 6.4% and PVA concentration was 4.0% and pH of the mixture had been maintained at approximately 4.8. Then, this mixture was cooled down to 28° C. with stirring and 700 grams of water was added therein, and subsequently, this mixture was cooled down to 15° C. 30 grams of 10% glutaraldehyde was then added into said mixture for hardening, and the pH of the said mixture was controlled at around 6.0 by addition of 2.5% sodium hydroxide solution. At this stage, capsule formation was completed, and resultant capsular suspension was used as a coating color for the manufacture of pressure-sensitive recording paper.

EXAMPLE 10

Acid-treated gelatin (30 grams, see Example 1 made by Nihon Hikaku K.K.) having an iso-electric point of pH 8.0 was dissolved in 270 grams of water at 60° C. to make a gelatin solution. 3 grams of crystal violet lactone and 2 grams of benzoyl leucomethylene blue were dissolved in 100 grams of KMC-A oil, and this oil solution was added into the above gelatin solution with continuous stirring to cause emulsification, forming an average particle size of oil droplets of about 8 microns. A solution of 2.5% sodium hydroxide was then added into the emulsion so that the pH was controlled at around 8.0. Separately, 3 grams of PVA-117 (see Example 1) was dissolved into 80 grams of water to make a PVA solution. Then, this PVA solution was mixed with said emulsion with continuous stirring. At that time, phase separation occurred and, at the same time, gelatin was deposited around oil droplets. The concentration of gelatin in the mixture at this final stage was 7.9% and PVA concentration was 0.85% and pH of the mixture had been maintained at approximately 8.0. Then, this mixture was cooled down to 28° C. with stirring, and 450 grams of water was added therein. Subsequently, this mixture was cooled down to 10° C. Then, 30 grams of 10% formaldehyde was added slowly into said mixture for hardening, and the pH of the said mixture was controlled at around 10.0 by addition of 2.5% sodium hydroxide solution. At this stage, capsule formation was completed, and resultant capsular suspension was used as a coating color for the manufacture of useful pressure-sensitive recording paper.

EXAMPLE 11

Acid-treated gelatin (25 grams, see Example 1 made by Nihon Hikaku K.K.) having an iso-electric point of pH 8.0 was dissolved in 370 grams of water at 60° C. to make a gelatin solution. 3 grams of crystal violet lactone and 2 grams of benzoyl leucomethylene blue were dissolved in 100 grams of KMC-A oil, and this oil solution was added into the above gelatin solution with continuous stirring to cause emulsification forming oil droplets of an average particle size of 4-5 microns. Then a solution of 2.5% sodium hydroxide was added into the emulsion so that pH was controlled at around 7.0. Separately, 15 grams of PVA-117 (see Example 1) was dissolved into 135 grams of water to make a PVA solution. This PVA solution was mixed with said emulsion with continuous stirring. At that time, phase separation occurs and, at the same time, gelatin was deposited around oil droplets. The concentration of gelatin in the mixture at this final stage was 5.8% and PVA concentration was 3.5% and pH of the mixture had been maintained at approximately 7.0. Then this mixture was cooled down to 28° C. with stirring and 0.5 gram of solid potassium periodate was added therein. This made the viscosity of mixture suddenly drop, and the resultant mixture was then cooled down to 15° C. without adding any further water. And then, 30 grams of 10% formaldehyde was added into said mixture for hardening. And, pH of the mixture was controlled at around 10.0 by addition of 2.5% sodium hydroxide solution. At this stage, capsule formation was completed, and resultant capsular suspension was used as a coating color for the manufacture of useful pressure-sensitive recording paper.

EXAMPLE 12

Acid-treated gelatin (15 grams, see Example 1 made by Nihon Hikaku K.K.) having an iso-electric point of pH 8.0 was dissolved in 185 grams of water at 60° C. to make a gelatin solution, and 100 grams of naphthalene powder was dispersed therein. The pH of this dispersion was controlled at 7.0 by addition of 2.5% sodium hydroxide solution. Separately, 10 grams of PVA-117 (see Example 1) was dissolved into 90 grams of water to make a PVA solution. Then, this PVA solution was mixed with above dispersion with continuous stirring. At that time, phase separation occurred and, at the same time, gelatin was deposited around said naphthalene particles. The concentration of gelatin in the said mixture at this final stage was 5.2% and PVA concentration was 3.5% and pH of the mixture had been maintained at around 7.0. This mixture was then cooled down to 30° C. with stirring and 50 grams of an aqueous solution containing 0.3 gram of potassium periodate was added thereinto. Subsequently, the mixture was cooled down to 18° C. with stirring and 30 grams of 10% glutaraldehyde was added thereto for hardening. At this stage, capsule formation was completed, and resultant concentrated capsular suspension was used as a coating for the manufacture of useful moth proof paper.

It will be appreciated, of course, that the foregoing examples are merely the illustrative embodiments of the invention, and that the herein disclosed and claimed novel technique of using PVA to cause a separation of a gelatin phase from an aqueous solution for the production of microencapsulated material can be carried out by other techniques. For instances, this invention also covers a modification in which PVA may be added as a solid powder while maintaining the temperature above the solving point of PVA in addition to mixing a PVA solution with a gelatin solution. Further, the PVA-gelatin solution can be formulated by adding either PVA powder to a gelatin solution or a gelatin powder to a PVA solution while maintaining a pH level at which phase separation of the gelatin is prevented. Thereafter, such a solution can have its pH adjusted to a level which will permit and cause phase separation of the gelatin, with ensuing production of the microencapsulated product.

Variations of the mode of practice of this invention are further illustrated in the following additional examples:

EXAMPLE 13

An acid treated gelatin (25 grams; see Example 1) having an iso-electric point of pH 8.0 was dissolved in 325 grams of water at 60° C. to make a gelatin solution. There is then dissolved 3 grams of crystal violet lactone and 2 grams of benzoyl leucomethylene blue were in 100 grams of KMC-A (iso-propylated naphthalene, made by Kureha Kagaku K.K., Japan). This oil solution was then emulsified into the above gelatin solution. Then 5% sodium hydroxide solution is added to adjust the pH of the resulting emulsion to about 8.2, following which 15 grams of PVA-117 powder is added to the emulsion followed by 135 grams of water. This mixture is then heated up to 85° C. to dissolve the PVA powder. Phase separation will occur during this step at which time the density of the gelatin and of the PVA in the mixture is 5.15% and 3.15% respectively. The pH was maintained at about 8.0, and subsequent steps in the process corresponded to those set forth in Example 1.

EXAMPLE 14

PVA-117, 15 grams, was dissolved in 335 grams of water. Then 3 grams of crystal violet lactone and 2 grams of benzoyl leucomethylene blue were dissolved in 100 grams of KMC-A (isopropylated naphthalene, made by Kureha Kagaku K.K., Japan). This oil solution was then emulsified into the PVA solution, and a 5% sodium hydroxide solution was added to bring the pH of the emulsion to about 8.0. The temperature of the emulsion was then adjusted to 25° C. and 25 grams of an acid-treated gelatin powder having an iso-electric point of 8.0 (see Example 1) was added to the emulsion and the mixture maintained in this condition for one hour. Thereafter, upon heating to about 60° C. the gelatin powder dissolved and phase separation took place with a gelatin density of 5.15% and a PVA density of 3.15%, with the pH remaining at about 8.0. The remaining steps of the process followed those stated in Example 1.

EXAMPLE 15

A solution was prepared by dissolving 25 grams of an acid-treated gelatin having an iso-electric point of pH 8.0 (see Example 1) in 245 grams of water. Then 3 grams of crystal violet lactone and 2 grams of benzoyl leucomethylene blue were dissolved in 100 grams of KMC-A (iso-propylated naphthalene, made by Kureha Kagaku K.K., Japan). This oil solution was then emulsified into the gelatin solution, and with the addition of about 80 grams of 10% acidic acid aqueous solution the pH was adjusted to about 2.5. Following this an aqueous solution containing 150 grams of PVA-117 was added to the emulsion and thereafter sodium hydroxide, 10% aqueous solution, was added to adjust the pH to 7.0. At this step, phase separation occurred, with the density of gelatin at 5.15% and that of PVA at 3.15%. The process then followed the procedures set forth in Example 1.

It will be further appreciated from the foregoing description that the process of this invention wherein PVA is employed to cause phase separation of gelatin from an aqueous solution can also be utilized for other technical purposes. The process of this invention has the advantage of being quite simple to carry out, and the lack of need for closely controlled reaction conditions means that it can easily be conducted in the commercial plant. Further, the high degree of uniformity available for the PVA and gelatin components, as compared to, e.g. gum arabic used in the prior art, is highly advantageous and contributes to an enhanced uniformity of product results.

The process is of course carried out with vigorous agitation, as by stirring, which is sufficient to produce the microencapsulated product as discrete fine particles free from any substantial agglomeration.

Other variations in this process which will nonetheless continue to utilize the essential novel and inventive aspects of this invention will readily occur to those skilled in the art, within the scope of the invention as defined by the following claims.

What is claimed is:

1. A method for the microencapsulation of core particles, which core particles consist essentially of water-immisible liquid droplets or finely-divided water-insoluble particulate solids, which method consists essentially in:
   (a) bringing said core particles into intimate contact with an aqueous solution containing
      (1) gelatin, or a water soluble derivative thereof selected from the group consisting of gelatin-acrylic amide graft copolymer, gelatin-vinyl pyrrolidone graft copolymer, gelatin-acrylic acid graft copolymer and gelatin-methacrylic ester graft copolymer, and
      (2) dissolved polyvinyl alcohol, or a water-soluble derivative thereof having at least one substituent selected from the group consisting of —COOH, —OCOCH$_3$, —NH$_2$ and —CONH$_2$, said polyvinyl alcohol component being present at a concentration of at least about 0.5% by weight of the combined polyvinyl alcohol component/gelatin component solution and of the core particles, and having an average degree of polymerization of at least about 1,000 and an average degree of hydrolyzation of at least 85%, (b) inducing phase separation of said gelatin component, while maintaining a pH level in said aqueous solution within a range which permits said phase separation, and while continuing to maintain a temperature above said gel point, whereby an encapsulating shell, composed substantially of said gelatin component, is formed around said individual core particles, and (c) thereafter lowering the temperature of the mixture to a level at or below the gelling point of said gelatin shell surrounding said encapsulated core particles, to cause gelation of the same.

2. A microencapsulation process consisting essentially of:
(1) forming a first solution comprising an aqueous solution of gelatin, or a water-soluble derivative thereof selected from the group consisting of gelatin-acrylic amide graft copolymer, gelatin-vinyl pyrrolidone graft copolymer, gelatin-acrylic acid graft copolymer and gelatin-methacrylic graft copolymer:
(2) forming a second solution comprising an aqueous solution of polyvinyl alcohol, or a water-soluble derivative thereof having at least one substituent selected from the group consisting of —COOH, OCOCH$_3$, —NH$_2$ and —CONH$_2$, said polyvinyl alcohol component having an average degree of polymerization at least about 1,000 and a degree of hydrolyzation at least about 85%;
(3) dispersing and suspending in at least one of said first and second solutions dispersant particles selected from the class consisting of a water-immisible liquid dispersed as finely divided liquid droplets and and a water-insoluble finely-divided discrete particulate solid dispersed as solid particles;
(4) mixing the two said solutions together including said dispersant;
(5) causing phase separation to occur in said mixed solution-dispersion so that said gelatin component is deposited around said dispersant particles, and wherein, in the said mixed solution-dispersion:
(a) said polyvinyl alcohol component is present at a concentration of at least about 0.5% by weight,
(b) the pH is maintained at a desired predetermined level which does not prevent phase separation,
(c) the temperature is maintained above the gel point temperature of said gelatin component;

(6) and thereafter cooling the phase-separated mixture to cause gelation of the resulting encapsulating material about the discrete solid particles or droplets of said dispersant.

3. The method of claim 2 wherein said gelatin is an acid-treated gelatin.

4. The method of claim 2 wherein said gelatin component is a gelatin-acrylic amide graft copolymer.

5. The method of claim 3 wherein said acid-treated gelatin has an iso-electric point between about pH of about 7.1 to pH of about 10.0.

6. The method of claim 2 wherein said gelatin is an alkali-treated gelatin.

7. The method of claim 6 wherein said alkali-treated gelatin has an iso-electric point between about pH of about 4.0 to pH of about 7.0.

8. The method of claim 2 wherein said water-soluble polyvinyl alcohol component is an carboxyethylated polyvinyl alcohol.

9. The method of claim 2 wherein said polyvinyl alcohol component has an average degree of polymerization of from about 1000 to about 2400.

10. The method of claim 2 wherein the pH of the mixture is maintained approximately at the point of iso-electric point of said gelatin component.

11. The method of claim 2 wherein the pH of the mixture is maintained approximately at the point of iso-electric point of said gelatin component and the concentration of said polyvinyl alcohol component in the mixture is adjusted to a level of at least about 2%.

12. The method of claim 2 wherein subsequent to said gelation step, said shell of gelation or gelatin component is hardened.

13. The method of claim 2 wherein, as an additional step, before the gelation component of capsulated gelatin in the capsular suspension is completed, a peroxidic oxidizing agent having an oxidation potential sufficient to degrade oxidatively the long-chain polymer molecules of said polyvinyl alcohol is added to said mixture in an amount sufficient to reduce the viscosity of the suspension to a level permitting facile stirring thereof, whereby the gelation step can be conducted without undue dilution of the suspension to provide a concentrated suspension of the gelled encapsulated particles.

14. The method of claim 10 wherein said peroxidic agent is periodic acid.

15. The method of claim 10 in which said peroxidic agent is potassium periodate.

16. The method of claim 10 in which said peroxidic agent is sodium periodate.

References Cited

UNITED STATES PATENTS

| Re. 24,899 | 11/1960 | Green | 252—316 |
|---|---|---|---|
| 3,244,640 | 4/1966 | Studt et al. | 252—316 |
| 3,328,257 | 6/1967 | Vrancken et al. | 252—316 X |
| 3,396,117 | 8/1968 | Schuetze | 252—316 X |

FOREIGN PATENTS

| 1,008,044 | 10/1965 | Great Britain | 252—316 |

RICHARD D. LOVERING, Primary Examiner

U.S. Cl. X.R.

117—36.2, 62.2, 100 A, 100 B; 264—4; 424—33, 37

UNITED STATES PATENT OFFICE
CERTIFICATE OF CORRECTION

Patent No. 3,804,775    Dated April 16, 1974

Inventor(s)    Tomoharu Shiozaki and Jujiro Kono

It is certified that error appears in the above-identified patent and that said Letters Patent are hereby corrected as shown below:

Column 12, line 24, delete "acidic" and insert

--acetic--.

Column 13, line 2, after "at least" insert --about--;

line 34, delete "and".

Column 14, line 24, "gelation", second occurrence, should read -- gelatin --.

line 27, the line should read: --step, before the gelation of capsulated gelatin component--.

Column 14, claims 14-16, line 1 of each, delete "10"

insert --13--.

Signed and sealed this 17th day of September 1974.

SEAL)
Attest:

McCOY M. GIBSON JR.    C. MARSHALL DANN
Attesting Officer    Commissioner of Patents